(12) United States Patent
Kameda (10) Patent No.: US 10,194,085 B2
(45) Date of Patent: Jan. 29, 2019

(54) IMAGE PICKUP APPARATUS AND ITS CONTROL METHOD

(71) Applicant: CANON KABUSHIKI KAISHA, Tokyo (JP)

(72) Inventor: Jun Kameda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 15/094,540

(22) Filed: Apr. 8, 2016

(65) Prior Publication Data

US 2016/0301872 A1    Oct. 13, 2016

(30) Foreign Application Priority Data

Apr. 10, 2015 (JP) .................................. 2015-080929

(51) Int. Cl.
  *H04N 5/232* (2006.01)
  *H04N 5/14* (2006.01)
  *G06T 5/50* (2006.01)

(52) U.S. Cl.
  CPC .......... *H04N 5/23277* (2013.01); *G06T 5/50* (2013.01); *H04N 5/145* (2013.01); *H04N 5/23232* (2013.01); *H04N 5/23254* (2013.01); *H04N 5/23261* (2013.01); *H04N 5/23267* (2013.01); *H04N 5/23287* (2013.01); *H04N 5/23293* (2013.01); *G06T 2207/20221* (2013.01)

(58) Field of Classification Search
  CPC .......... H04N 5/23277; H04N 5/23232; H04N 5/145; H04N 5/23293; H04N 5/23267; H04N 5/23261; H04N 5/23254; H04N 5/23287; G06T 5/50; G06T 2207/20221
  See application file for complete search history.

(56) References Cited

U.S. PATENT DOCUMENTS

2015/0281712 A1* 10/2015 Callahan .............. H04N 19/174
  382/233

FOREIGN PATENT DOCUMENTS

JP      2007-074031 A    3/2007

* cited by examiner

*Primary Examiner* — Twyler L Haskins
*Assistant Examiner* — Angel L Garces-Rivera
(74) *Attorney, Agent, or Firm* — Cowan, Liebowitz & Latman, P.C.

(57) ABSTRACT

An image pickup apparatus includes an image processing unit configured to process an image, a display unit configured to provide a live-view display in which images processed by the image processing unit are sequentially displayed, and a control unit configured to make, when determining that the image pickup apparatus is panning, the image processing unit produce a synthesized image by synthesizing a plurality of images arranged in a time series, and the display unit display the synthesized image produced by the image processing unit as a frame image in the live-view display. At least one processor or circuit is configured to perform a function of at least one of the units.

17 Claims, 11 Drawing Sheets

IMAGE PICKUP APPARATUS AND ITS CONTROL METHOD

BACKGROUND OF THE INVENTION

Field of the Invention

The present invention relates to an image pickup apparatus and its control method.

Description of the Related Art

There is known a follow shot assisting method that corrects a difference between a moving speed of an object and a panning speed by moving an image stabilization lens in a follow shot and prevents a blur of a main object caused by the difference. Japanese Laid-Open Patent Application No. ("JP") 2007-74031 divides each of continuously captured images into a target area and other areas, overlaps the target areas each other among the plurality of images, and synthesizes the images into one image so that the other areas are blurred among the plurality of images.

The follow shot assisting method detects a vector of a main object by using a plurality of images continuously captured at a shutter speed that does not cause a blur of the main object and is higher than a shutter speed set by a user in the follow shot. Herein, a live-view display is provided so as to follow a moving main object. If the captured image is displayed as it is in the live-view display, a displayed image has a background that is not flowed, and a user has difficulties in imagining a follow shot result from the live-view image. The method disclosed in JP 2007-74031 cannot solve this problem.

SUMMARY OF THE INVENTION

The present invention provides an image pickup apparatus and its control method, which can provide a live-view display that can prevent a blur of a main object, and enable a user to follow the main object and to predict a follow shot result.

An image pickup apparatus according to one aspect of the present invention includes an image processing unit configured to process an image, a display unit configured to provide a live-view display in which images processed by the image processing unit are sequentially displayed, and a control unit configured to make, when determining that the image pickup apparatus is panning, the image processing unit produce a synthesized image by synthesizing a plurality of images arranged in a time series, and the display unit display the synthesized image produced by the image processing unit as a frame image in the live-view display. At least one processor or circuit is configured to perform a function of at least one of the units.

Further features of the present invention will become apparent from the following description of exemplary embodiments with reference to the attached drawings.

DESCRIPTION OF THE EMBODIMENTS

Figure 1:
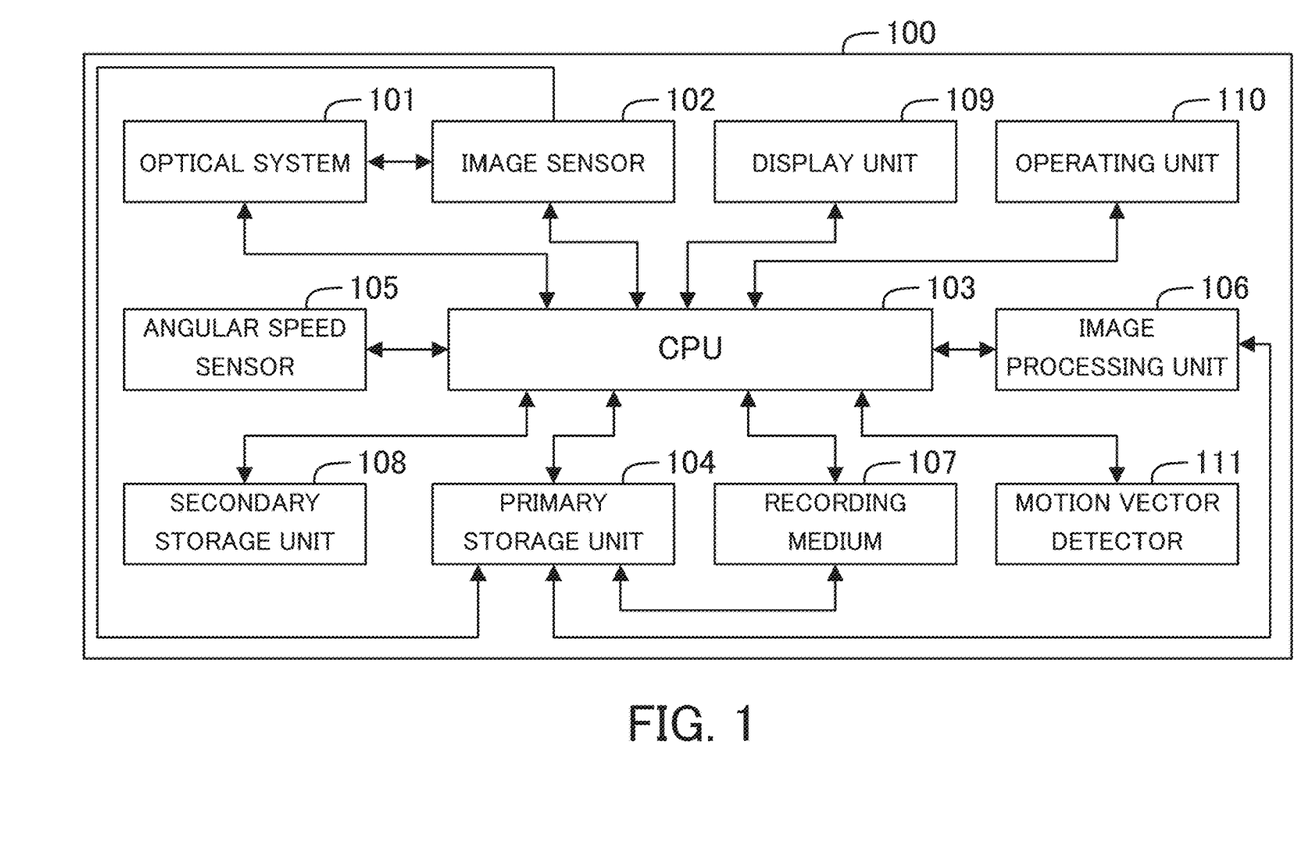
FIG. 1 is a block diagram of an image pickup apparatus according to first, second, and third embodiments of the present invention.

FIG. 1 is a block diagram illustrating a basic configuration of an image pickup apparatus 100 according to this embodiment. The image pickup apparatus 100 may be a digital still camera, a digital video camera, a cellular phone having a camera function, a personal computer ("PC") with a camera, etc.

The image pickup apparatus 100 includes an optical system 100, an image sensor 102, a CPU 103, a primary storage unit 104, an angular speed detector 105, an image processing unit 106, a recording medium 107, a secondary storage unit 108, a display unit 109, an operating unit 110, and a motion vector detecting unit 111.

The optical system 100 includes a lens, a shutter, and a diaphragm, and forms an object image. The lens includes a focus lens, a zoom lens, and an image stabilization lens. The focus lens is moved in the optical axis direction for focusing. The zoom lens (magnification varying lens) is moved in the optical axis direction so as to change a focal length. The image stabilization lens is moved in a direction orthogonal to the optical axis so as to stabilize an image. The orthogonal direction may have a component orthogonal to the optical axis, and the image stabilization lens may be moved obliquely to the optical axis. The diaphragm is disposed at an exit pupil position of the optical system and adjusts the light quantity. The shutter opens and closes at a set shutter speed, and stops exposure.

The image pickup apparatus 100 may be a lens integrated type or a lens interchangeable type in which a lens unit (interchangeable lens) having the optical system 101 is attached to and detached from an image pickup apparatus body. In the latter case, the camera body may be a single-lens reflex camera or a non-reflex camera (mirrorless camera).

The image sensor 102 includes a CCD image sensor, a CMOS image sensor, etc., and photoelectrically converts an object image formed by the optical system 101.

The CPU 103 serves as a control unit of each part in the image pickup apparatus 100 according to an input signal and a previously stored program, and includes a microcomputer. In the image pickup system that includes a camera body and a lens unit, the control unit can include a camera CPU provided in the camera body and configured to control an image pickup system, and a lens CPU configured to control each part in the lens unit under control of the camera CPU.

The primary storage unit 104 is a volatile memory, such as a RAM, temporarily stores data, and is used for an operation of the CPU 103. The information stored in the primary storage 104 is used for the image processing unit 106, and recorded in the recording medium 107.

The angular speed detector (detecting unit) 105 includes a gyro sensor, etc., detects an angular speed indicative of a moving amount of the image pickup apparatus 100, converts it into an electric signal, and sends the electric signal to the CPU 103. In the lens interchangeable type image pickup system, the angular speed detector 105 may be provided to the camera body or lens unit.

The image processing unit 106 performs image processing, such as a development and a tone adjustment on the basis of an image pickup mode, to an image signal obtained from the image sensor 102. The user can set, through the operating unit 110, an image processing pattern which the image processing unit 106 applies. Part of at least one of the image processing unit 106 may be implemented by the CPU 103 through software.

The recording medium 107 stores image data etc. obtained by image pickup and stored in the primary storage unit 104. Like a semiconductor memory, the recording medium 107 can be detached from and attached to the image pickup apparatus 100, and the recorded data can be read out in the PC by attaching the recording medium 107 to the PC. The image pickup apparatus 100 has an ejecting function and read/write function.

The secondary storage unit 108 is, for example, a non-volatile memory, such as an EEPROM, stores various set information and programs (firmware) to control the image pickup apparatus 100, and is used for the CPU 103.

The display unit 109 is a liquid crystal display, etc. configured to display a viewfinder image in the image pickup, a captured image, and a GUI image for dialogue operations. The display unit 109 can provide a live-view (LV) display that sequentially displays images processed by the image processing unit 106. Thereby, the user can perform live-view capturing in which the user captures an image while viewing the live-view image.

The operating unit 110 includes input devices configured to receive operations by the user and to transmit input information to the CPU 103, such as a button, a lever, a dial, a touch panel, a voice detector, and a detector of a user's line of sight.

For example, the operating unit 110 includes a release button. According to (a signal S1 generated in response to) half-pressing of the release button, the CPU 103 calculates a driving amount of a diaphragm based on a photometric result by the unillustrated photometric sensor or an aperture value set by the user, and drives the diaphragm. According to the half-press of the release button, the CPU 103 unlocks the image stabilization lens so as to make it drivable. Thereafter, the CPU 103 drives the image stabilization lens according to the detection result of the angular speed detector 105. According to (a signal S2 generated in response to) full pressing of the release button, the CPU 103 drives the shutter, and leads the light flux from the optical system 101 to the image sensor 102 for exposure (image pickup).

The CPU 103 controls the image processing unit 106 based on the output from the image sensor 102 so as to generates image data (motion image and still image), and to record the image data in the recording medium 107. The CPU 103 can acquire information of a maximum angle (maximum correcting angle) by which the image stabilization lens can correct from the optical system 101. In the above image pickup system, the camera CPU can acquire information of the maximum correcting angle from the lens CPU.

The operating unit 110 serves as a setting unit configured to set a variety of modes, and image pickup conditions, such as a shutter speed for the still image pickup and a focus detecting frame that defines an object to be focused in the autofocus ("AF")

A variety of modes includes a follow shot (assisting) mode, a live-view display mode, and an AF mode.

The follow short assisting mode is a mode used to assist the follow shot, corrects a difference between the moving speed of the object and the panning speed by moving the image stabilization lens, and prevents a blur of the main object caused by the difference in the follow shot. In addition to this, the CPU 103 sets the shutter speed to a previously stored value and provides continuous AF on the main object. In the follow shot assisting mode, the user may set the shutter speed through the operating unit 110. The live-view mode is a mode that sequentially displays images on the display 109, and may be selected in the follow shot assisting mode instead of the optical viewfinder of the single-lens reflex camera. Thereby, the user can follow the main object as a moving object while viewing the display 109 in the follow shot. At that time, the user can set a frame rate ("acquisition frame rate" hereinafter) can through the operating unit 110, at which the image processing unit 106 obtains a frame image from the image sensor 102. The frame rate is defined as the number of frames (or (still) images) to be processed per a unit time period, such as one second, is expressed by a unit of fps. The present invention does not always require the follow shot assisting mode to be set in the follow shot.

As described later, the acquisition frame rate in the live-view display on the display unit 109 may be different between when the image pickup apparatus 100 is being rotated (or panned) and when the image pickup apparatus 100 is not being rotated (or panned). The user may set the acquisition frame rate for the panned image pickup apparatus 100 through the operating unit 110. Alternatively, the CPU 103 may set the acquisition frame rate to a previously stored value when the follow shot assisting mode is set by the operating unit 110.

The number of frame images per unit time period displayed on the display unit 109 (or the number of updating images on the display unit 109) will be referred to as a "display frame rate" hereinafter. As described later, the display frame rate in the live-view display on the display unit 109 may be different between when the image pickup apparatus 100 is panning and when the image pickup apparatus 100 is not panning. The user may set the display frame rate for the panned image pickup apparatus 100 through the operating unit 110. Alternatively, the CPU 103 may set the display frame rate for the panned image pickup apparatus 100 to a previously stored value when the operating unit 110 sets the follow shot assisting mode.

The motion vector detecting unit 111 receives at least two frame images from the image sensor 102, and detects a motion vector for each of a plurality of areas set to the two input frame images. The motion vector can be detected using a known method, such as template matching. The frame image at this time is continuously captured at a high shutter speed (by the electronic shutter) so that the main object cannot be blurred, and the user can confirm it as a live-view image.

However, when this live-view shutter speed is different from the shutter speed of the still image pickup in the follow shot, the flowing degree of the background is different between the live-view image and the follow shot result, and it becomes difficult to conceive the follow shot result.

Figure 2:
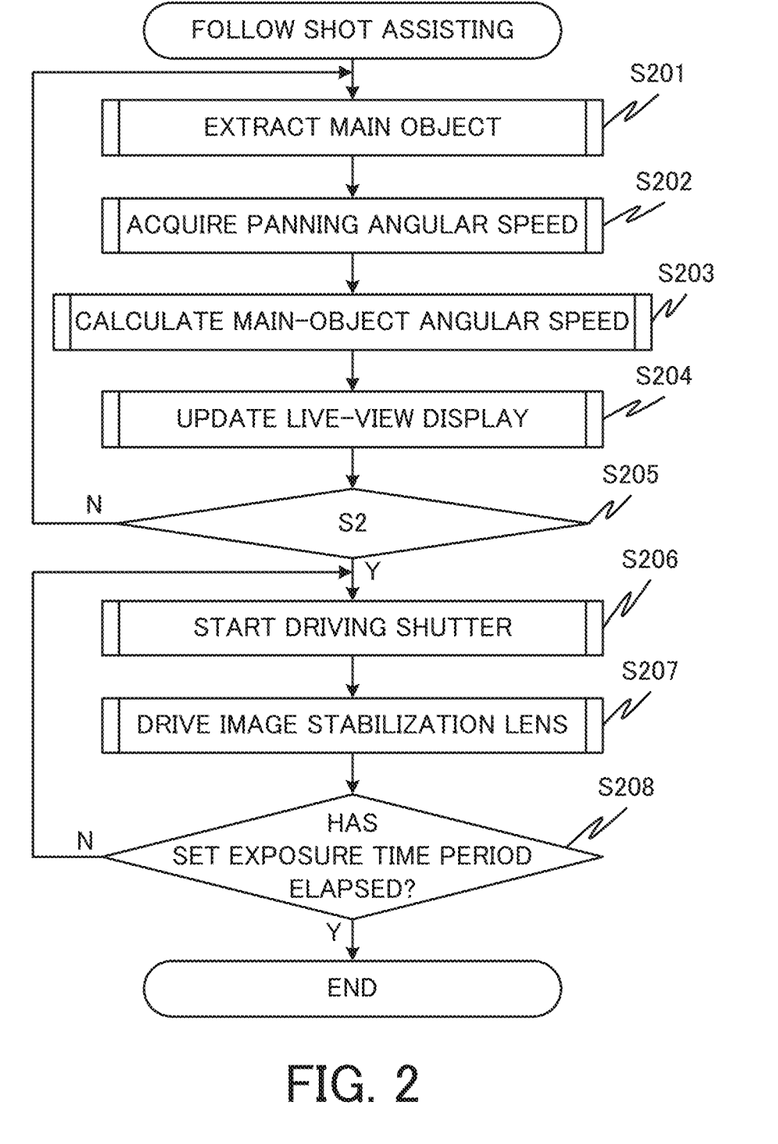
FIG. 2 is a flowchart of follow shot assisting according to the first, second, and third embodiments of the present invention.

FIG. 2 is a flowchart for explaining a control method of the image pickup apparatus 100 or a follow shot assisting method executed by the CPU 103, and "S" stands for the step. "Y" means Yes, and "N" means No. FIG. 2 and other flowcharts can be implemented as a program that enables a computer to execute each step, and the program can be stored in a non-transitory computer-readable storage medium.

Initially, in S201, the CPU 103 extracts a main object area using a motion vector obtained by the motion vector detecting unit 111 from a captured image. In the method for extracting the object area from the motion vector can apply a histogram and a known method. When the histogram is used, the CPU 103 creates a histogram that illustrates a relationship between a magnitude and the times of a motion vector based on information of the motion vector in each of a plurality of areas in the frame image. Next, a motion vector of the main object as the moving object is detected in this histogram based on the information of the magnitude of the motion vector having the times equal to or larger than a threshold. When the main object cannot be extracted, the angular speed of the main object cannot be calculated, and the normal capturing method may be selected that does not drive the image stabilization lens in S207.

Next, in S202, the CPU 103 acquires the angular speed information of panning of the image pickup apparatus 100 detected by the angular speed detector 105. While this embodiment discusses panning in the rotations of the camera, which is horizontal swinging of the camera, the present invention is applicable to tilting which is vertical swinging of the camera. While the image stabilization provides detections and corrections in two orthogonal axes, such as a horizontal direction and a vertical direction, the following description will focus on only one axis because the operations in the two directions are performed by similar structure.

Figure 3:
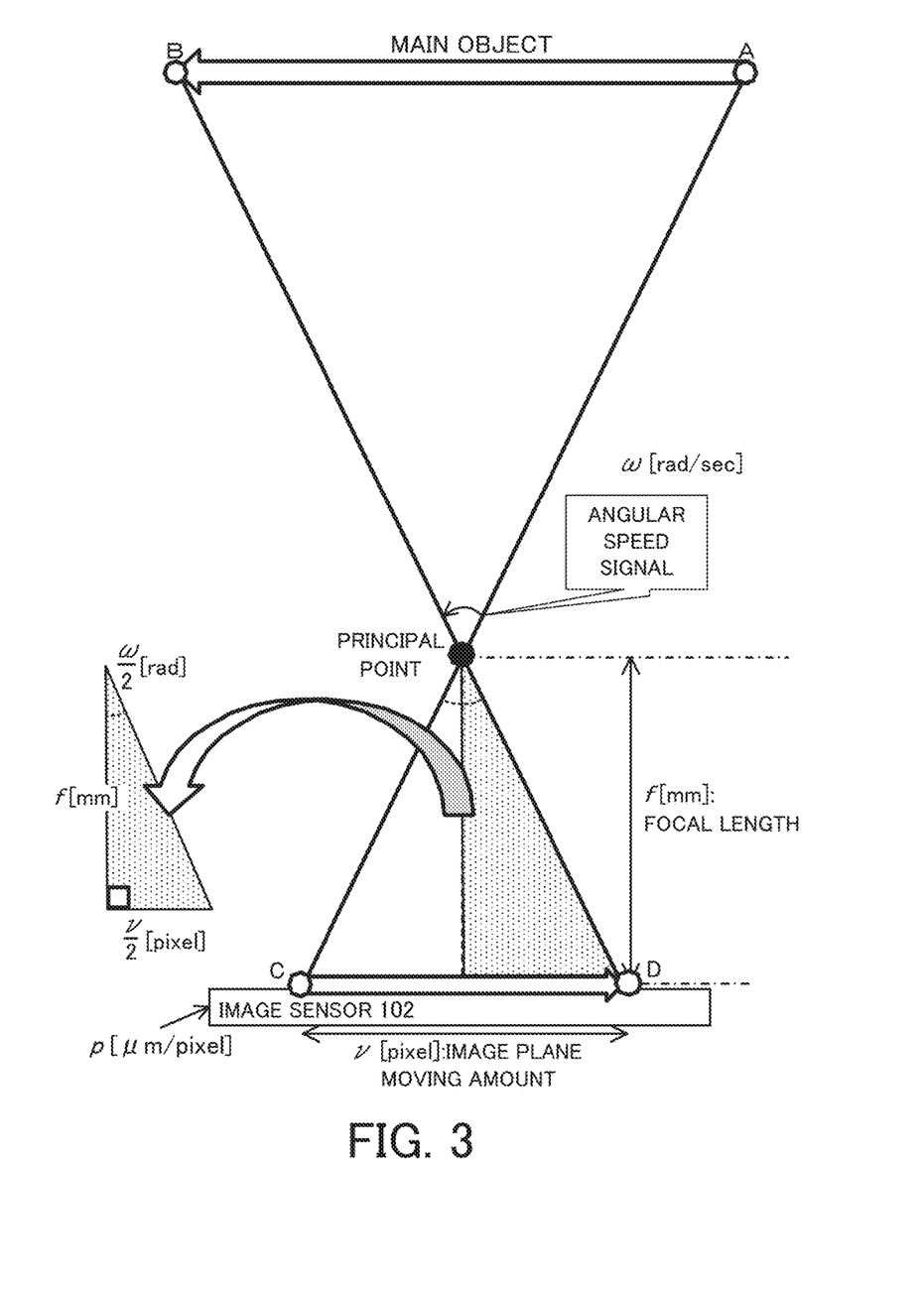
FIG. 3 is a view illustrating one example of S202 illustrated in FIG. 2 according to the first embodiment of the present invention.

FIG. 3 is a view for explaining a method for acquiring information of an angular speed of a main object executed by the CPU 103. More specifically, FIG. 3 illustrates that the main object moves from point A to point B during a period of "t," and that the main object image formed on the image sensor 102 moves from point C to point D accordingly. An angular speed a [rad/sec] of the main object on the image plane will be expressed as follows where v [pixel] is a distance (image plane moving amount) from the point C to the point D, f [mm] is a focal length, and p [μm/pixel] is a pixel pitch.

Expression 1

$$\tan\frac{\omega}{2}[\text{rad/sec}] = \frac{v}{2}[\text{pixel}] \times \frac{p}{1000}[\text{mm/pixel}] \div \quad (1)$$
$$t[\text{sec}] \div f[\text{mm}]$$
$$= \frac{vp}{2000\,tf}$$

$$\omega = 2\tan^{-1}\left(\frac{vp}{2000\,tf}\right)[\text{rad/sec}]$$

When the image pickup apparatus 100 is panned, the angular speed ω of the main object on the image plane can be expressed by subtracting a panning angular speed $\omega_p$ from a main-object angular speed $\omega_s$ of the main object that is an angular speed of the main object itself as follows:

Expression 2

$$\omega = \omega_s - \omega_p \quad (2)$$

The main-object angular speed $\omega_s$ is calculated based on Expression (2) as follows:

Expression 3

$$\omega_s = \omega + \omega_p \quad (3)$$

The information of the panning angular speed $\omega_p$ is acquired from the angular speed detector 105, and the main-object angular speed ω on the image plane is obtained from the motion vector detecting unit 111. As a result, the CPU 103 can calculate the main-object angular speed $\omega_s$ based on Expression 3. The calculating method of the main-object angular speed is not limited to that in this embodiment, and may use a method for using a predefined value through the operating unit 110.

Next, in S204, the CPU 103 updates the live-view display in the follow shot. In S205, the CPU 103 determines whether or not the exposure is to be performed, herein based on whether or not the release button has been fully pressed (S2). When there is S2 (N of S205), the flow returns to S201. When S2 is detected in S205, the flow moves to S206. In S206, the CPU 103 drives the shutter in the optical system 101.

Next, in S207, the CPU 103 drives the image stabilization lens in the optical system 101, and corrects the blur of the object caused by the difference between the moving speed of the object and the panning speed. S207 calculates ω based on Expression (2), and uses the latest information detected by the angular speed detector 105 in the exposure for the panning angular speed $\omega_p$ and the value calculated in S203 for the main-object angular speed $\omega_s$. The CPU 103 integrates the angular speed of this difference and calculates the moving amount of the image stabilization lens. Next, in S208, the CPU 103 closes the shutter after the set exposure period elapses.

First Embodiment

Figure 4:
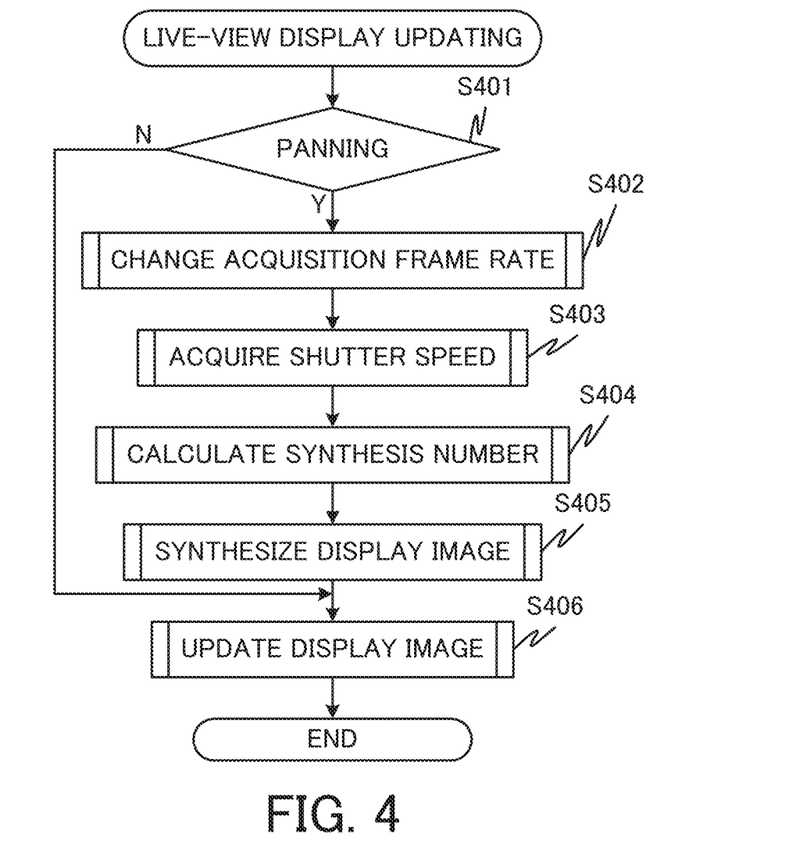
FIG. 4 is a flowchart illustrating details of S204 illustrated in FIG. 2 according to the first embodiment of the present invention.
Figure 5:
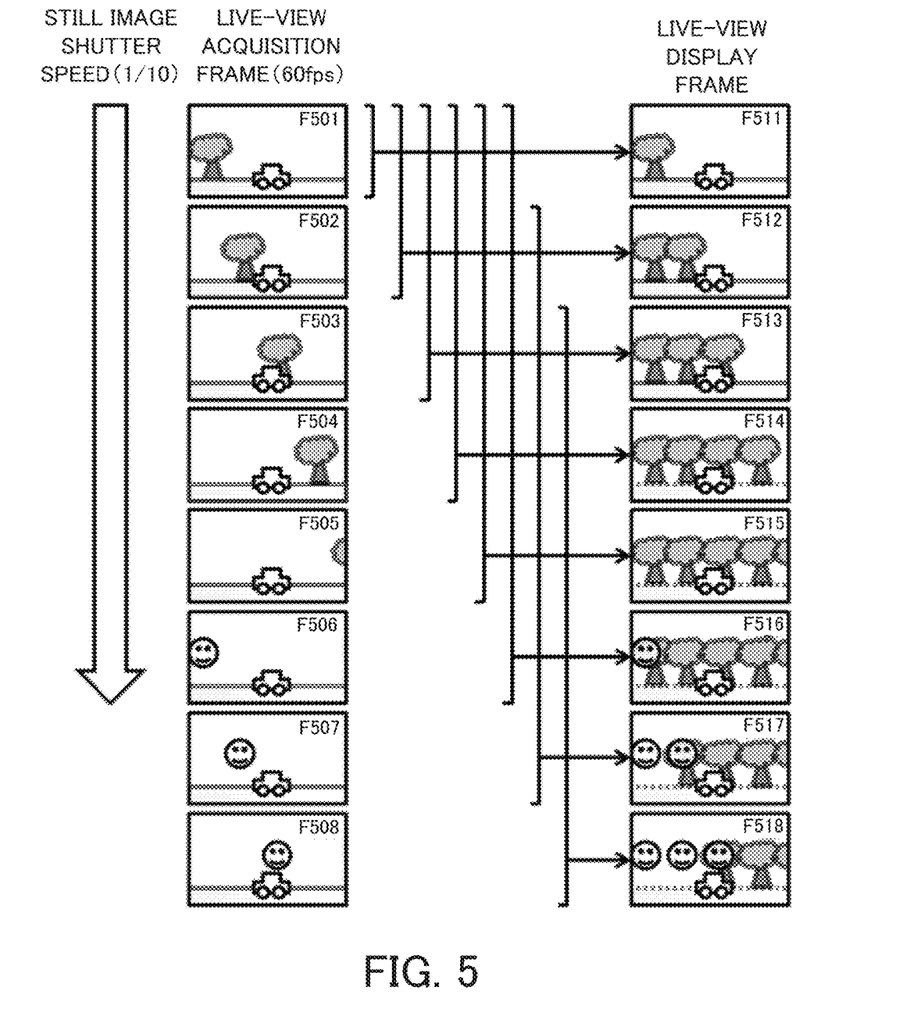
FIG. 5 is a view illustrating one example of live-view images of S405 illustrated in FIG. 4 according to the first embodiment of the present invention.
Figure 6:
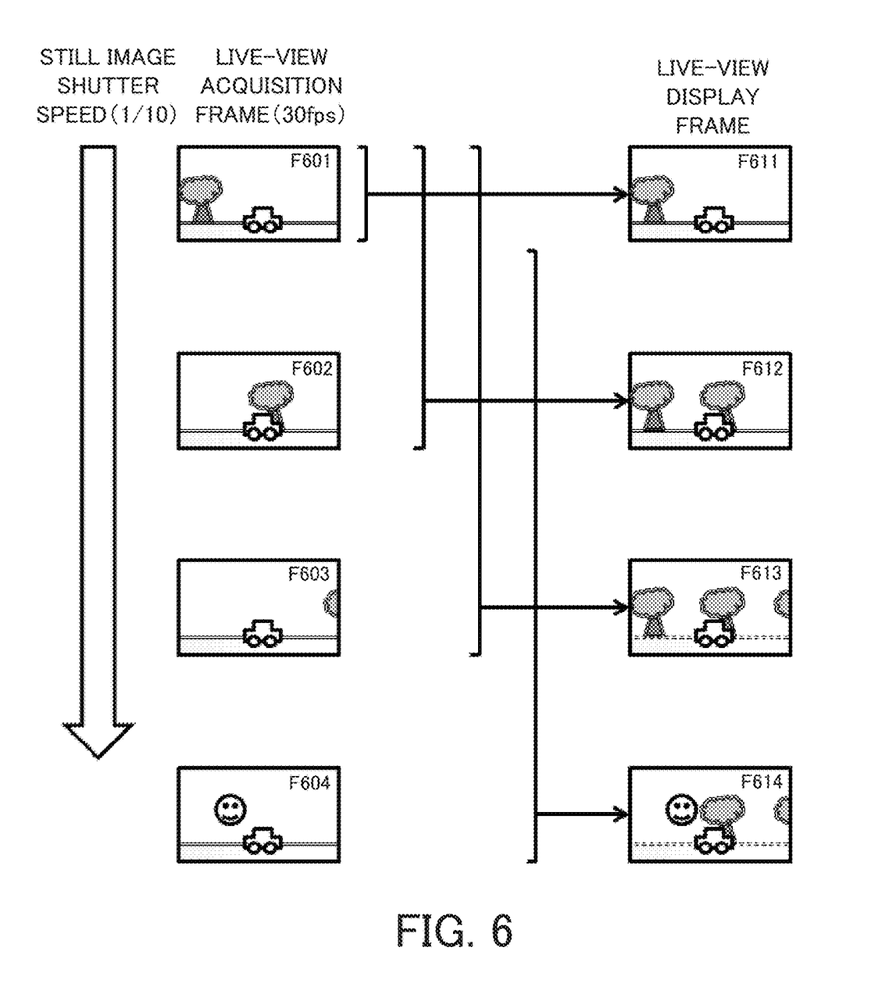
FIG. 6 is a view illustrating another example of live-view images in S405 illustrated in FIG. 4 according to the first embodiment of the present invention.

FIG. 4 is a flowchart illustrating details of S204 according to the first embodiment. FIGS. 5 and 6 are views illustrating display examples of the live-view images in the follow shot.

In S401 (first step), the CPU 103 determines whether the image pickup apparatus 100 is being panned based on information of the panning angular speed acquired in S202. For instance, the CPU 103 can determine whether the image pickup apparatus 100 is being panned, by comparing the panning speed with the threshold stored in the secondary storage unit 108. The CPU 103 moves to S402 when the image pickup apparatus 100 is being panned, and moves to S406 otherwise.

In S402, the CPU 103 changes the acquisition frame rate. As described above, the acquisition frame rate is the number of frame images (or the capturing number of frame images used for the live-view display) which the image processing unit 106 obtains from the image sensor 102 per a unit time period. The image processing unit 106 acquires the frame image from the image sensor 102 in synchronization with the designated timing according to the input or set value through the operating unit 110. For example, when the pre-change acquisition frame rate is 30 fps, the CPU 103 can increase the value to a higher value of 60 fps. In this case, the CPU 103 can send a command of changing the acquisition frame rate to a driving unit of the image sensor 102 in addition to the image processing unit 106.

As a result, as illustrated in FIG. 5, the number of synthesized images displayed on the display unit 109 can be increased. In FIGS. 5 and 6, the acquisition frame is a frame image which the image processing unit 106 acquires from the image sensor 102 at the acquisition frame rate. The display frame is a frame image that is processed by the image processing unit 106, and displayed on the display unit 109 at the display frame rate.

At this time, the acquisition frame rate can be changed according to the luminance of the object within an upper limit of an exposure time period for appropriate exposure, or as illustrated in FIG. 6, the acquisition frame rate may be maintained. A higher acquisition frame rate enables the user to visually recognize the background flowing amount. In FIGS. 5 and 6, the acquisition frame rate is the same as the display frame rate. However, the acquisition frame rate may be different from the display frame rate.

Next, in S403, the CPU 103 acquires information of the shutter speed for the still image pickup. As described above, the shutter speed for the still image pickup may be set by the operating unit 110 or stored as a predefined value in the secondary storage unit 108. Hence, the CPU 103 can acquire the information of the shutter speed for the still image pickup from the operating unit 110 or the secondary storage unit 108.

Next, in S404, the CPU 103 calculates the number of synthesized images based on the acquisition frame rate and the shutter speed. The synthesis number is calculated based on Expression (4).

Expression 4

$$Tv \div \frac{1}{fps} = m \quad (4)$$

For example, when the acquisition frame rate fps is 60 fps and the shutter speed Tv is 1/10 sec, the synthesized number m is 6. The image processing unit 106 prepares the synthesized image within this synthesis number.

Next, in S405 (second step), the CPU 103 makes the image processing unit 106 produce the synthesized image by synthesizing a plurality of frame images that are arranged in a time series. In FIG. 5, the display image is produced by sequentially synthesizing the frame images obtained in a time series within the synthesis number calculated in S404. Finally, in S406 (third step), the CPU 103 makes image processing unit 106 update the display of the display frame.

The image processing unit 106 includes an internal memory for primarily store the frame image or utilizes the primary storage unit 104.

For example, the image processing unit 106 displays an acquisition frame F501 as a display frame F511, and primarily stores the acquisition frame F501. Next, the image processing unit 106 synthesizes a new acquisition frame F502 with the primarily acquired acquisition frame F501, and displays the produced frame image as the display frame F512. In addition, the image processing unit 106 primarily stores the acquisition frame F502 as well as the acquisition frame F501. Thereafter, similarly, the image processing unit 106 displays the synthesized image of the acquisition frames F501 to F503 as a display frame F513, and primarily stores the acquisition frames F501 to F503. Next, the image processing unit 106 displays the synthesized images F501 to F504 as a display frame F514, and primarily stores the acquisition frames F501 to F504. Next, the image processing unit 106 displays the synthesized image of the acquisition frames F501 to F505 as a display frame F515, and primarily stores the acquisition frames F501 to F505. Next, the image processing unit 106 displays the synthesized image of the acquisition frames F501 to F506 as a display frame F516, and primarily stores the acquisition frames F502 to F506. When the synthesized number reaches m expressed in Expression (4), the image processing unit 106 displays the synthesized images F502 to F507 as a display frame F517, and primarily stores the acquisition frames F502 to F507. Thereafter, the display frame is updated by synthesizing the acquisition frames arranged in a time series while the synthesized number is maintained.

Since the background flows in the display frame illustrated in FIGS. 5 and 6, the user can visually recognize the flow shot result before the flow shot.

The first embodiment uses an image made by synthesizing the plurality of acquisition frames for the display frame in the live-view in S204, the user can visually recognize a background flowing amount after the image is captured. Thus, this embodiment can provide a live-view display for live-view capturing (or a flow shot herein), which enables the user to easily predict an image pickup result.

For example, before the image is captured, the user can predict a shutter speed for still image pickup necessary to obtain a background flowing amount suitable for the current panning angular speed while viewing the live-view images, and can prepare for a main image pickup based on the prediction result. For example, a desired flow shot result can be easily obtained in the main flow short based on the result of live-view display updating (S204) of a racing car that circles a circuit. Thus, the present invention is particularly effective when the main object or a similar object repeats similar operations before the flow shot. Of course, the main object is not limited to the racing car for the circuit, and the present invention is applicable to a player in an Olympic game, a horse and rider in a horse race, etc.

Second Embodiment

Figure 7:
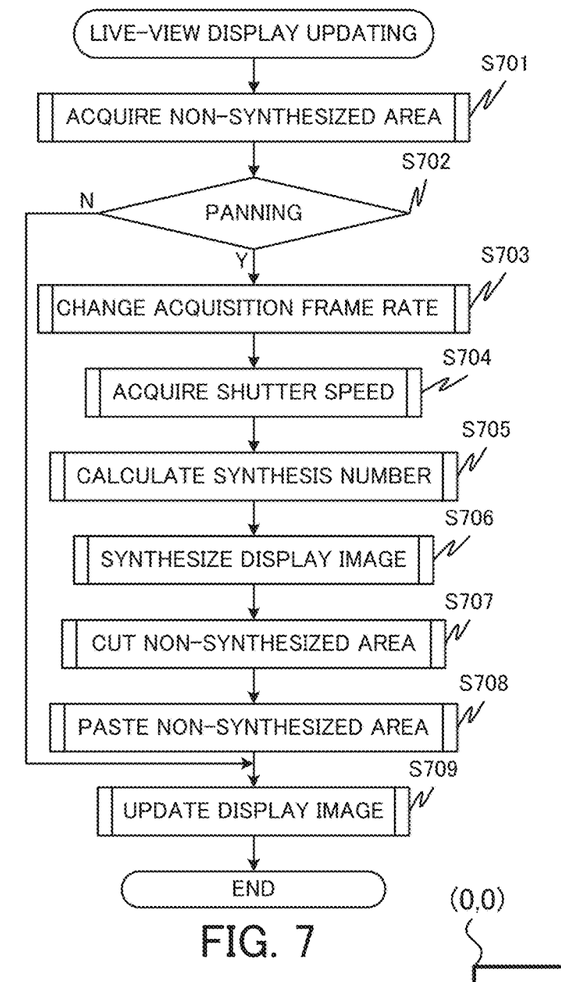
FIG. 7 is a flowchart illustrating details of S204 illustrated in FIG. 2 according to the second embodiment of the present invention.

FIG. 7 is a flowchart illustrating details of S204 according to the second embodiment. The second embodiment is similar to the first embodiment in that the display frame in the live-view in the panning is the synthesized image of the acquisition frames, but is different from the first embodiment in that the display frame has a non-synthesized area and the latest acquisition frame is displayed as it is in the non-synthesized area. The image processing unit 106 produces the synthesized image by synthesizing a plurality of acquisition frame images, by cutting the non-synthesized area (specific area) in the latest frame image among the plurality of frame images, and by pasting the cut area onto the synthesized image.

In S701, the CPU 103 makes the image processing unit 106 acquire the information of the non-synthesized area. The non-synthesized area may be an area that contains an area around the main object extracted in S201 in FIG. 2, a range arbitrarily set by the user through the operating unit 110, an area that contains the focus detecting frame, etc.

Figure 8:
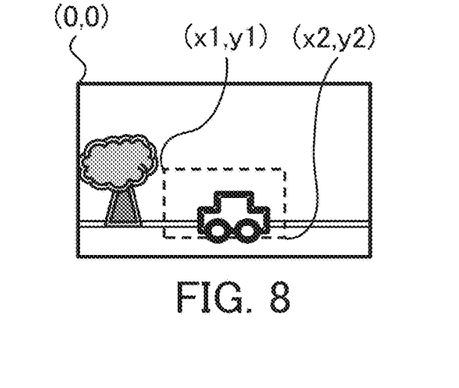
FIG. 8 is a view illustrating one example of a non-synthesized area of S701 illustrated in FIG. 7 according to the second embodiment.

FIG. 8 is a view illustrating an example of the non-synthesized area. FIG. 8 sets the upper left corner in the display area to an origin (0, 0), and the non-synthesized area as a rectangular area enclosed by broken lines, which ranges from an upper left corner position defined by an offset (x1, y1) to an lower right corner position defined by an offset (x2, y2). Thus, the contour or frame of the non-synthesized area may be added to the synthesized image for display.

In FIG. 7, S702 to S706 are similar to S401 to S405 in the first embodiment, and a description thereof will be omitted. In S707, the CPU 103 instructs the image processing unit 106 to cut the non-synthesized area from the latest frame image. In S708, the CPU 103 instructs the image processing unit 106 to prepare the display frame by pasting the non-synthesized area. Finally, in S709, the CPU 103 makes the image processing unit 106 update the produced display frame.

Figure 9:
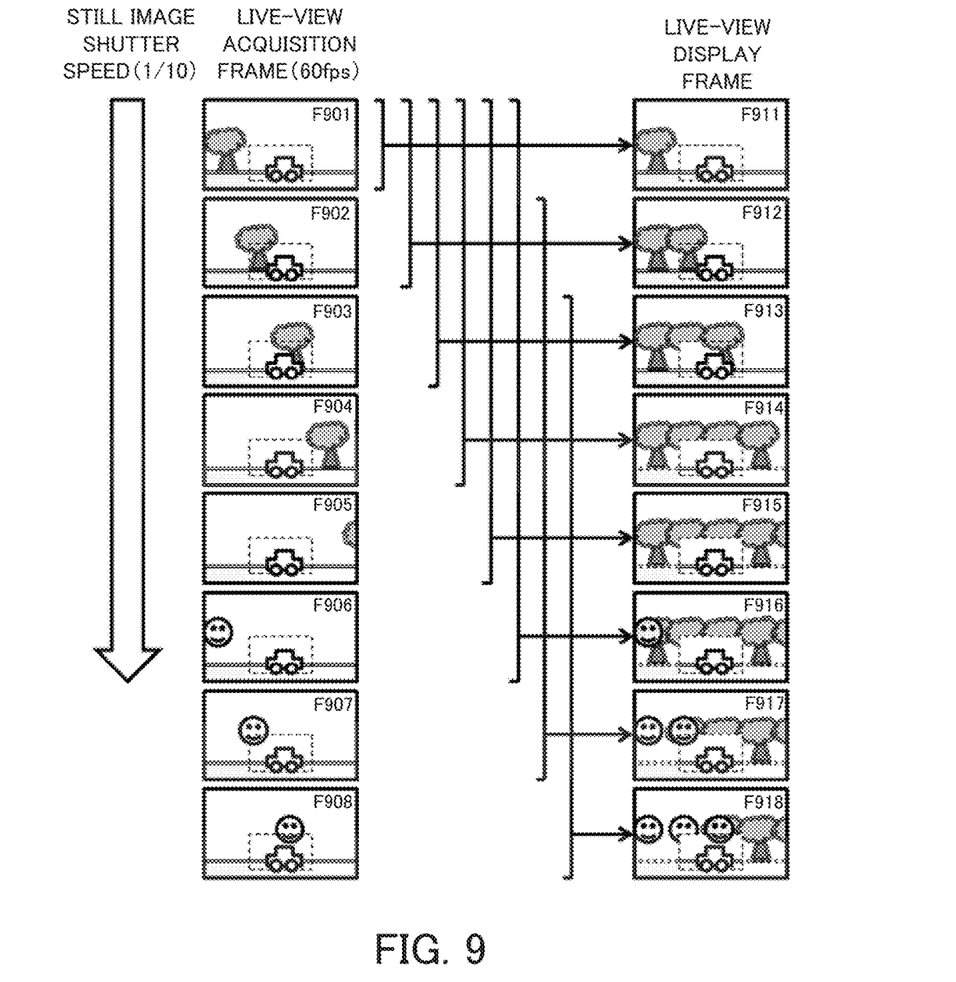
FIG. 9 is a view illustrating one example of live-view images of S708 illustrated in FIG. 7 according to the second embodiment.

FIG. 9 is a view illustrating a display example of live-view images in the flow shot according to the second embodiment, and the non-synthesized area is pasted onto the synthesized image produced by S701-S706. Display frames F911 to F918 are produced for acquisition frames F901 to F908.

For example, the acquisition frame F901 is displayed as it is as the display frame F911, and the acquisition frame F901 is primarily stored. Next, the new acquisition frame F902 is synthesized with the primarily stored acquisition frame F901 and the non-synthesized area of the acquisition frame F902 is pasted onto the synthesized image. This frame image is displayed as the display frame F912, and the acquisition frames F901 and F902 are primarily stored. Thereafter, in the similar manner, the frame image is displayed as the display frame F913 in which the non-synthesized area of the acquisition frame F903 is pasted onto the synthesized image of the acquisition frames F901 to F903, and the acquisition frames F901 to F903 are primarily stored. When the synthesis number reaches m expressed in Expression (4), the image processing unit 106 sequentially updates the display frame by synthesizing timewise consecutive acquisition frames while the synthesis number is maintained.

Since the background of the display frame flows in FIG. 9, the user can visually recognize the follow shot result before the follow shot.

The second embodiment uses, in S204, a synthesized image of the plurality of acquisition frames for the display frame in the live-view. Thus, the user can visually recognize the background flowing amount when the image is captured. In addition, since the non-synthesized image is pasted onto the display frame, the user can confirm a composition of the main object in the flow shot result, the area to be real-time followed by the user, and the focus state of the object. Thus, this embodiment can provide live-view display for the live-view capturing that enables the user to easily predict the image pickup result.

Third Embodiment

Figure 11:
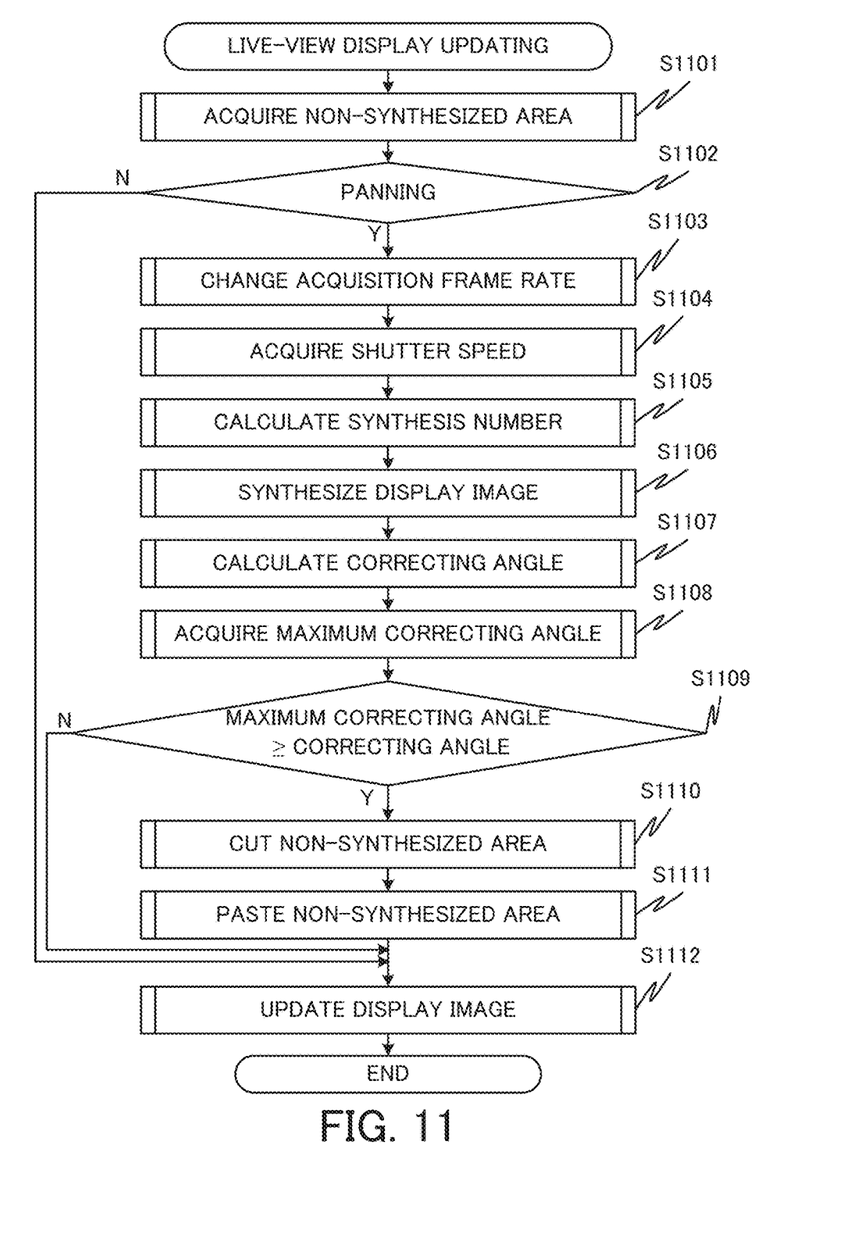
FIG. 11 is flowchart illustrating details of S204 illustrated in FIG. 2 according to the third embodiment.

The third embodiment is similar to the second embodiment in that the synthesized image and the non-synthesized image are displayed in the display frame for the live-view in the panning, but is different from the second embodiment in that the display of the non-synthesized area can be switched based on the correction limit of the image stabilization lens. As described above, in response to the still image pickup operation, the CPU 103 generates, based on the angular speed of the main object, a command of driving the image stabilization lens in the direction orthogonal to the optical axis so as to provide a follow shot in which the main object (moving object) in the non-synthesized area stands still.

Figure 10:
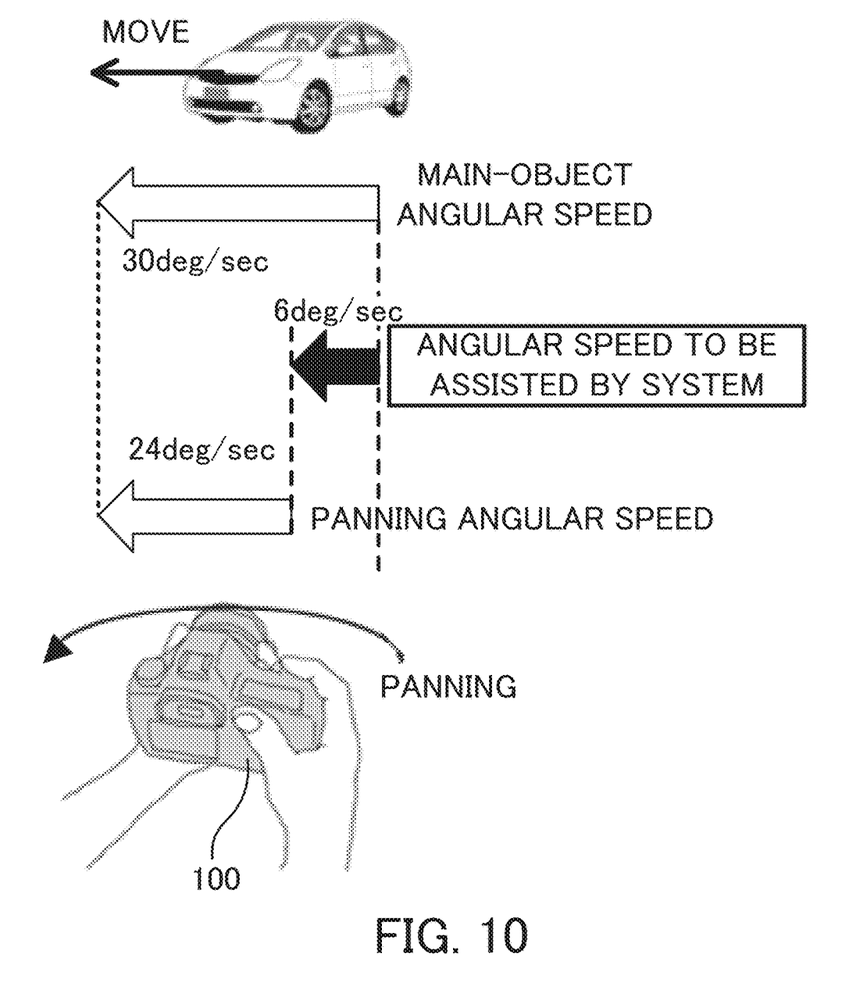
FIG. 10 is a view illustrating an angular speed of an object and a panning speed of the image pickup apparatus according to the third embodiment.

FIG. 10 illustrates the main-object angular speed and the panning angular speed around the principal point as a center. When the angular speed of the main object is 30 deg/sec and the panning angular speed is 24 deg/sec, a difference of 6 deg/sec is an angular speed to be assisted by the system (or to be corrected by driving the image stabilization lens). When the angular speed to be assisted by the system is multiplied by the shutter speed, a correcting angle to be assisted by the system is calculated so as to obtain the stationary main object. In an example, when the shutter speed is 1/10 sec, the necessary correcting angle is 0.6 degrees. However, when the correcting angle exceeds the maximum correcting angle of the image stabilization lens, the image of the stationary main object cannot be obtained. Herein, assume that the angular speed to be assisted by the system is $\omega_r$, the shutter speed is Tv, the correcting angle is $\theta$, and the maximum correcting angle is $\theta_{max}$. Then, Expression (5) is established.

Expression 5

$$\omega_r \times Tv = \theta_r (\leq \theta_{max}) \qquad (5)$$

FIG. 11 is a flowchart illustrating the details of S204 according to the third embodiment. S1101 to S1106 are similar to S701 to S706 illustrated in FIG. 7, and a description thereof will be omitted.

In S1107, the CPU 103 calculates a correcting angle using Expression (5). Next, in S1108, the CPU 103 acquires a maximum correcting angle from the optical system 101. Next, in S1109, the CPU 103 compares the maximum correcting angle with the correcting angle calculated in Expression (5), and moves to S1112 when the correcting angle exceeds the maximum correcting angle, and instructs the image processing unit 106 to use the synthesized image prepared in S1106 for the display image.

When the correcting angle is equal to or smaller than the maximum correcting angle in S1109, the CPU 103 moves to S1110 and instructs the image processing unit 106 to cut the non-synthesized area from the latest frame. In addition, the CPU 103 instructs the image processing unit 106 to produce the display image by pasting the non-synthesized area onto the synthesized image in S1111. Finally, the CPU 103 makes the image processing unit 106 update the produced display frame in S1112.

Figure 12:
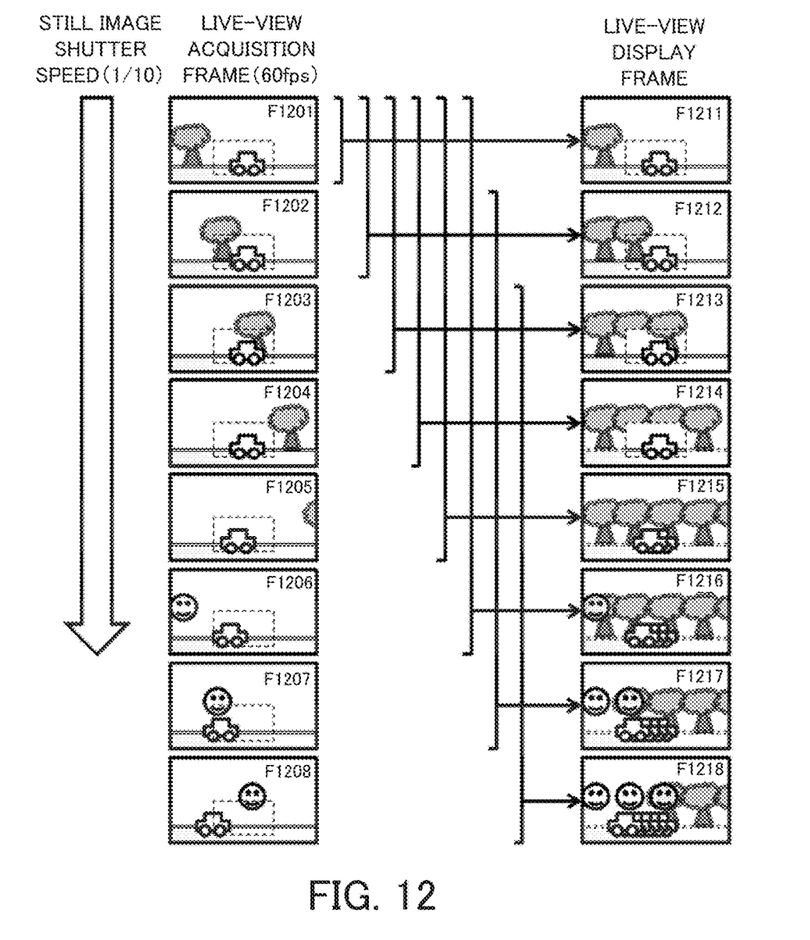
FIG. 12 is a view illustrating one example of a live-view image in S1111 illustrated in FIG. 11 according to the third embodiment.

FIG. 12 is a view illustrating a display example of live-view images in the follow shot according to the third embodiment, and illustrates that the difference between the angular speed of the object and the panning speed of the camera in the panning cannot be corrected. Display frames (display images) are F1211 to F1218 for acquisition frames F1201 to 1208.

Now assume that the maximum correcting angle of the image stabilization lens is 0.5 degrees and the shutter speed is 1/10 seconds. In the period from the acquisition frame F1201 to the acquisition frame F1204, the angular speed of the object is 30 deg/sec and the panning angular speed is 30 deg/sec. In addition, in the period from the acquisition frame F1205 to the acquisition frame F1208, the angular speed of the object is 30 deg/sec and the panning angular speed is 24 deg/sec. Expression (6) is established based on the angular speed of the object, the panning angular speed, the shutter speed, the correcting angle, and the maximum correcting angle and Expression (5) in the period from the acquisition frame F1201 to the acquisition frame F1204.

Expression 6

$$(30-30) \times \frac{1}{10} = 0 (\le 0.5) \quad (6)$$

Expression 7 is established based on the angular speed of the object, the panning angular speed, the shutter speed, the correcting angle, and the maximum correcting angle and Expression (5) in the period from the acquisition frame F1205 to the acquisition frame F1208.

Expression 7

$$(30-24) \times \frac{1}{10} = 0.6 (> 0.5) \quad (7)$$

Expression (6) is applied to the display frames F1211 to F1214. Since the correcting angle is equal to or smaller than the maximum correcting angle in S1109, the non-synthesized area is displayed and the user can visually recognize the non-blurred object before the image is captured. Expression (7) is applied to the display frames F1215 to F1218. Since the correcting angle is larger than the maximum correcting angle in S1109, the non-synthesized area is not displayed and the blurred main object is displayed, and the user can visually recognize that the object is not properly corrected before the image is captured.

Thus, when the CPU 103 determines that the stationary main object is captured by the follow shot by driving the image stabilization lens, the CPU 103 makes the image processing unit 106 produce the synthesized image onto which the non-synthesized area is pasted. On the other hand, when the CPU 103 determines that the stationary main object is not captured by the follow shot by driving the image stabilization lens, the CPU 103 makes the image processing unit 106 produce the synthesized image that has no pasted non-synthesized area. In other words, the image processing unit 106 produces the synthesized image by synthesizing the plurality of frame images with one another even regarding the non-synthesized area.

The third embodiment uses, in S204, the synthesized image of the plurality of acquisition frames for the display frame in the live-view, the user can visually recognize the background flowing amount after the image is captured. Since the non-synthesized image is pasted onto the display frame, the user can confirm a composition of the main object as the follow shot result, an area to be real-time followed by the user, and the focus state of the object. Moreover, the display of the non-synthesized area can be switched according to the correcting limit of the image stabilization lens, and the user can visually recognize that the object is correctible in the follow shot assisting system. Thus, this embodiment can provide live-view display for the live-view capturing that enables the user to easily predict the image pickup result.

The image pickup apparatus according to the present invention is applicable to a digital still camera, a digital video camera, and an electronic apparatus with a camera, etc.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-080929, filed on Apr. 10, 2015 which is hereby incorporated by reference herein in its entirety.

What is claimed is:
1. An image pickup apparatus comprising:
an image processing unit configured to process an image;
a display unit configured to provide a live-view display in which images processed by the image processing unit are sequentially displayed; and
a control unit configured to make, when determining that the image pickup apparatus is panning, the image processing unit produce a synthesized image by synthesizing a plurality of images arranged in a time series, and the display unit display the synthesized image produced by the image processing unit as a frame image in the live-view display,
wherein the image processing unit synthesizes the plurality of frame images with one another within a synthesis number obtained from a shutter speed for still image pickup, and
wherein at least one processor or circuit is configured to perform a function of at least one of the units.
2. The image pickup apparatus according to claim 1, wherein the synthesis number is obtained from the shutter speed for still image pickup, and an acquisition frame rate in the live-view of the display unit.

3. The image pickup apparatus according to claim 1, further comprising a setting unit configured to set the shutter speed.

4. The image pickup apparatus according to claim 1, further comprising a setting unit configured to set a follow shot mode, wherein the control unit sets the shutter speed to a previously stored value when the follow shot mode is set by the setting unit.

5. The image pickup apparatus according to claim 1, wherein the image processing unit produces the synthesized image by cutting a specific area from a latest frame image among the plurality of frame images and by pasting the specific area onto a synthesized image of the plurality of frame images.

6. The image pickup apparatus according to claim 5, wherein the image processing unit adds a contour of the specific area to the synthesized image.

7. The image pickup apparatus according to claim 5, further comprising a motion vector detecting unit configured to detect a motion vector of a moving object based on information of a motion vector in each of a plurality of areas in the frame image,
wherein the control unit sets the specific area so as to contain the moving object detected by the motion vector detecting unit.

8. The image pickup apparatus according to claim 5, further comprising a setting unit configured to set a focus detecting frame that defines an object to be focused,
wherein the control unit sets the specific area so as to contain the focus detecting frame set by the setting unit.

9. The image pickup apparatus according to claim 5, wherein the control unit generates, in response to an operation for still image pickup, a command of driving a correcting unit so as to provide a follow shot in which a moving object is stationary in the specific area, based on an angular speed of the moving object in the specific area, and
wherein the control unit makes the image processing unit produce the synthesized image onto which the specific area is pasted, when the control unit determines that the follow shot in which a moving object is stationary can be provided by driving the correcting unit, and makes the image processing unit produce the synthesized image onto which the specific area is not pasted when the control unit determines that the follow shot in which a moving object is stationary cannot be provided by driving the correcting unit.

10. The image pickup apparatus according to claim 1, wherein the control unit determines whether the image pickup apparatus is panning, based on a detection result of a detecting unit configured to detect an angular speed of the image pickup apparatus.

11. The image pickup apparatus according to claim 1, wherein an acquisition frame rate at which the image processing unit acquires the frame image in the live-view display by the display unit is different between when the image pickup apparatus is panning and when the image pickup apparatus is not panning.

12. The image pickup apparatus according to claim 11, further comprising a setting unit configured to set the acquisition frame rate when the image pickup apparatus is panning.

13. The image pickup apparatus according to claim 11, further comprising a setting unit configured to set a follow shot mode,
wherein the control unit sets the acquisition frame rate to a previously stored value when the follow shot mode is set by the setting unit and the image pickup apparatus is panning.

14. The image pickup apparatus according to claim 1, wherein a display frame rate at which the display unit displays the frame image in the live-view display is different between when the image pickup apparatus is panning and when the image pickup apparatus is not panning.

15. The image pickup apparatus according to claim 14, further comprising a setting unit configured to set the display frame rate when the image pickup apparatus is panning.

16. The image pickup apparatus according to claim 14, further comprising a setting unit configured to set a follow shot mode,
wherein the control unit sets the display frame rate to a previously stored value when the setting unit sets the follow shot mode and the image pickup apparatus is panning.

17. A control method of an image pickup apparatus that includes an image processing unit configured to process an image, and a display unit configured to provide a live-view display in which images processed by the image processing unit are sequentially displayed, the control method comprising:
a first step of determining whether or not the image pickup apparatus is panning;
a second step of making, when the first step determines that the image pickup apparatus is panning, the image processing unit produce a synthesized image by synthesizing a plurality of images arranged in a time series; and
a third step of making the display unit display the synthesized image produced by the second step as a frame image in the live-view display,
wherein the image processing unit synthesizes the plurality of frame images with one another within a synthesis number obtained from a shutter speed for still image pickup.

* * * * *